United States Patent [19]
Johnson

[11] 4,030,779
[45] June 21, 1977

[54] INFLATABLE STREAMLINING STRUCTURE FOR VEHICLES

[76] Inventor: David W. Johnson, 1884 Sunset Blvd., San Diego, Calif. 92103

[22] Filed: Mar. 18, 1976

[21] Appl. No.: 668,327

[52] U.S. Cl. .............................. 296/1 S; 296/91; 105/2 A
[51] Int. Cl.² ...................................... B62D 35/00
[58] Field of Search ................ 296/1 S, 1 R, 91; 105/2 A, 2 R; 280/159

[56] References Cited
UNITED STATES PATENTS

| | | | |
|---|---|---|---|
| 2,737,411 | 3/1956 | Potter | 296/1 S |
| 3,814,472 | 6/1974 | Zelikovitz | 296/1 S |

*Primary Examiner*—Philip Goodman
*Attorney, Agent, or Firm*—Ralph S. Branscomb

[57] ABSTRACT

The invention is an inflatable drag reduction structure for attachment to a moving vehicle such as a trailer or a truck body.

10 Claims, 14 Drawing Figures

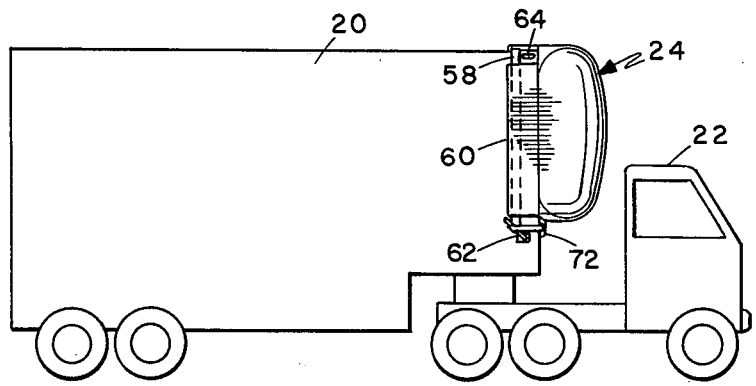
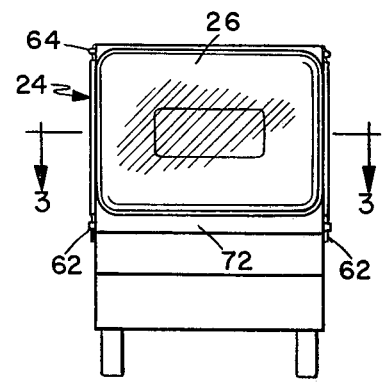
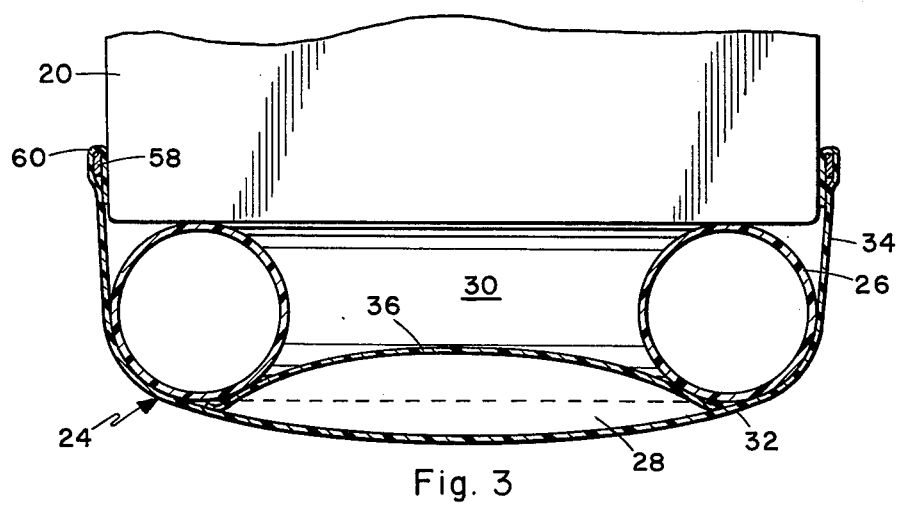
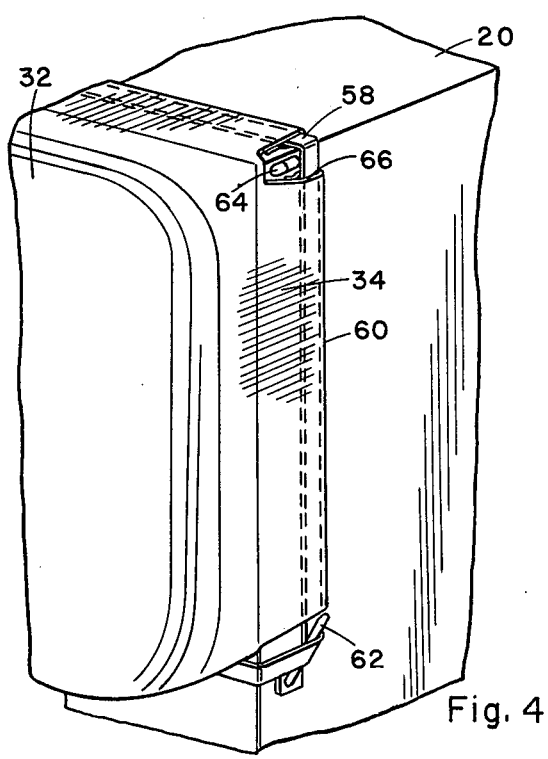
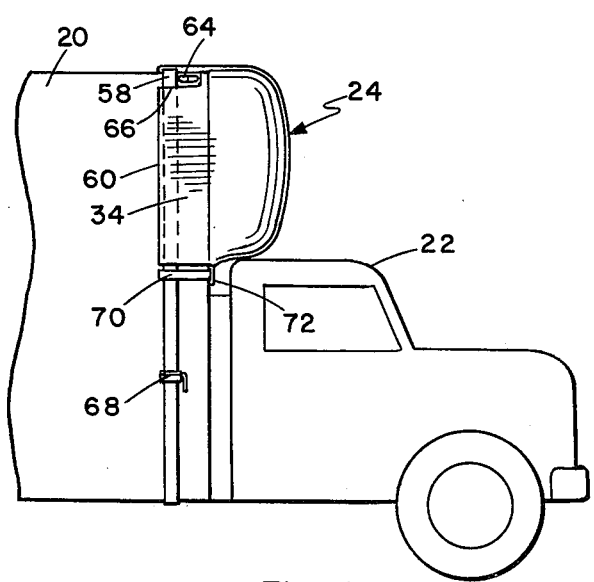

INFLATABLE STREAMLINING STRUCTURE FOR VEHICLES

BACKGROUND OF THE INVENTION

The invention relates to streamlining devices and more particularly to drag reduction structures utilized on moving vehicles.

It is well known that the drag produced by the flat or bluff front of a moving body such as a trailer would be lessened if the front surface were contoured somewhat, but until recently it has not been worth the cost or bother to manufacture semitrailers and the like having contoured fronts, or to provide contoured attachments for the front of trucks. High volumetric efficiency has been the primary design consideration for such trucks resulting in the manufacture of generally box-shaped vehicles. However, with increased fuel costs, streamlining is no longer impractical, and serious effort is being devoted toward developing an economical contoured attachment for the front ends of trailers, and perhaps the rear ends as well.

Because streamlining attachments must be fairly large, typically they are heavy as well as fairly expensive. At least one attempt has been made to develop an inflatable unit for this purpose as is exemplified in U.S. Pat. No. 2,737,411, which discloses an inflatable tail structure for a truck. This device, however, is not completely inflatable but utilizes a plate or frame member to rigidify that portion of the inflated body which is flush against the truck surface. Due to the tendency of the single inflated envelope disclosed in the above-referenced patent to assume a spherical shape, considerable stress would be experienced by the inflatable material along the edges of the mounting plate tending to tear the body loose from the vehicle. In addition, inasmuch as this structure is not compartmentalized or otherwise reinforced in a manner that would preserve its streamlined shape, it is questionable that the shape would be maintained under actual conditions of use.

There is a need, therefore, for a completely inflatable drag reducing structure which is form retaining under inflated conditions in use and which can be attached to the front of a trailer of the like in a way that no prying or destructive forces are produced tending to dislodge the structure from the trailer.

SUMMARY OF THE INVENTION

The present invention fulfills such a need and comprises one or more inflatable bodies which are generally cylindrical or spherical and are permitted to assume substantially their natural shape upon inflation so that stresses on the mountings and the like are reduced, and a flexible skirt is used to fair the body or bodies to the outside perimeter of the trailer so that a smooth, streamlined contour is presented to the wind. Several different arrangements of the inflated bodies are disclosed herein.

BRIEF DESCRIPTION OF THE DRAWINGS

FIG. 1 is a side elevation view of a typical tractor and trailer with the fairing attached;

FIG. 2 is a front view of the trailer and fairing;

FIG. 3 is an enlarged sectional view taken on line 3—M of FIG. 2;

FIG. 4 is a perspective view showing the fairing attachment;

FIG. 5 is a side elevation view of an alternative fairing attachment to a truck;

DETAILED DESCRIPTION OF THE PREFERRED EMBODIMENTS

Figure 6:
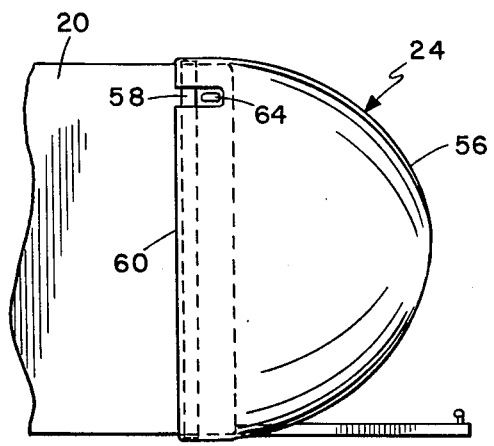
FIG. 6 is a side elevation view of an alternative type of fairing on a trailer.

FIG. 1 illustrates diagrammatically a trailer 20 being towed by a cab 22, it being apparent from the drawing that the trailer extends upwardly considerably above the cab so that the front, flat end of the trailer encounters passing air as it is towed. The streamlining device 24 is illustrated in FIG. 1 attached to the upper portion of the trailer front end such that a contoured surface is encountered by the passing wind rather than a flat, bluff surface. It has been found that considerable reduction in the drag produced by a bluff body can be achieved by simply rounding the edges such that their radii of curvature is about 0.15 times the lateral dimension of the bluff face, and the further reduction in drag achieved by utilizing a hemispherical or even more streamlined surface is slight compared to the advantage of rounding the edges as described. Thus the structure as illustrated in FIG. 1, although not particularly streamlined in appearance, is quite effective in reducing drag and improving fuel mileage.

Turning to FIG. 2, it can be seen that the streamlining device includes an inflated body 26, further detailed in FIG. 3, which is tubular in shape and defines a rectangle in front elevation. As seen in FIG. 3, a second inflated body 28 of generally lenticular cross section and rectangular in front elevation spans the open area 30 which is defined centrally of the rectangular tube structure so that when both these bodies are inflated, as shown in FIGS. 1 and 3, a smooth contour will be produced which does not occupy as much space longitudinally of the truck as would a single, nontubular inflated body. The body 28 may be composed of a sheet of material 32 which extends across the entire front of the tube structure defining the forward surface of the pouch 28 and continues rearwardly to form a skirt 34 which fairs the streamlining member to, and attaches it to, the sides of the trailer. The rear surface of the inflated body or pouch 28 is defined by a second sheet 36 which is heat sealed or otherwise attached to the sheet 32 so that the tube 26 is more or less snuggly nested between the pouch 28 and the skirt fairing 34.

It can be seen from an inspection of FIG. 3 that both the inflated bodies have been permitted to substantially assume their natural shapes when inflated so that no stresses are directed against any of the structure other than the expansionary forces which maintain the bodies inflated. Although the pouch 28 would, if over-inflated, tend to assume a spherical shape, at a lesser degree of inflation, the lenticular shape illustrated in FIG. 3, wherein both sides are equally convex and neither side is restrained to a flat position, would be expected.

Figure 11:
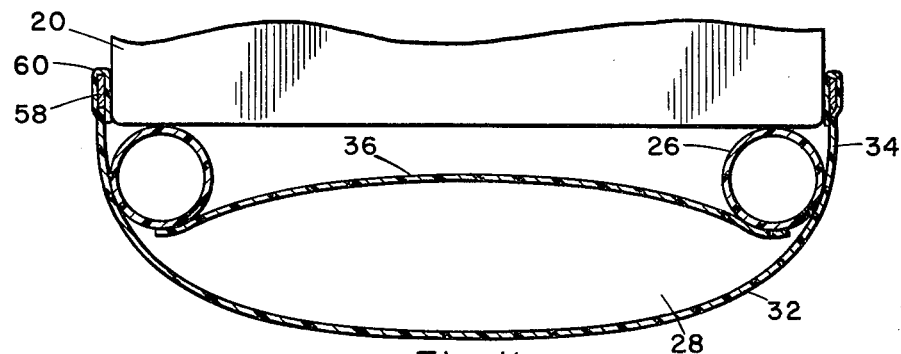
FIG. 11 is a sectional view similar to FIG. 3, showing an alternative inflation arrangement.
Figure 12:
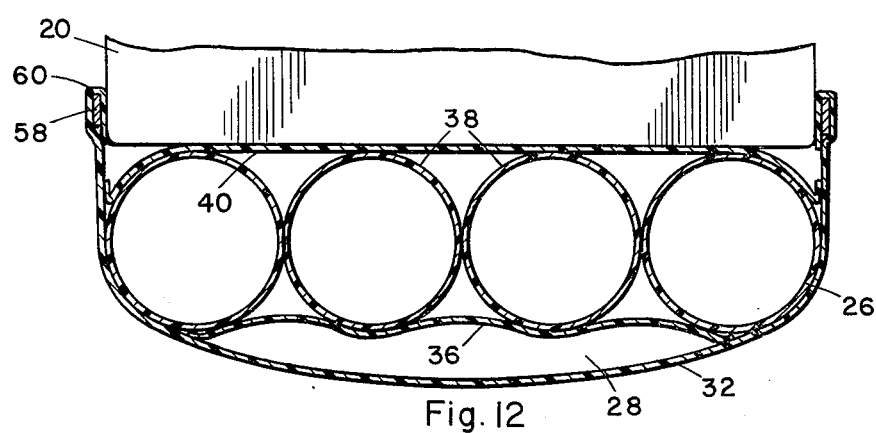
FIG. 12 is a similar sectional view showing another inflation arrangement.

A slightly modified embodiment of the structure thus far described is illustrated in FIG. 11 wherein the sheets 32 and 36 used to form the inflated body 28 do not directly meet but are seamed on the tubular body 26 so that a virtually identical effect is achieved. In another modification illustrated in FIG. 12, a second pair of tubular inflated members 38 have been added between the front of a trailer and the uprights of the inflatable body 26. This addition would tend to prevent the inward deformation of the outer tube structure 26 and also provide more support for the front pouch 28. A third sheet 40 has been added to stabilize all the tubes and prevent their undue lateral expansion. It is likely that the air space between the sheet 40 and 36 would not be inflated but would be at atmospheric pressure and that the other tubular inflated bodies would communicate so that only one point of inflation would be necessary. The front pouch could be at the same pressure as the tubes, or a somewhat reduced pressure.

Figure 13:
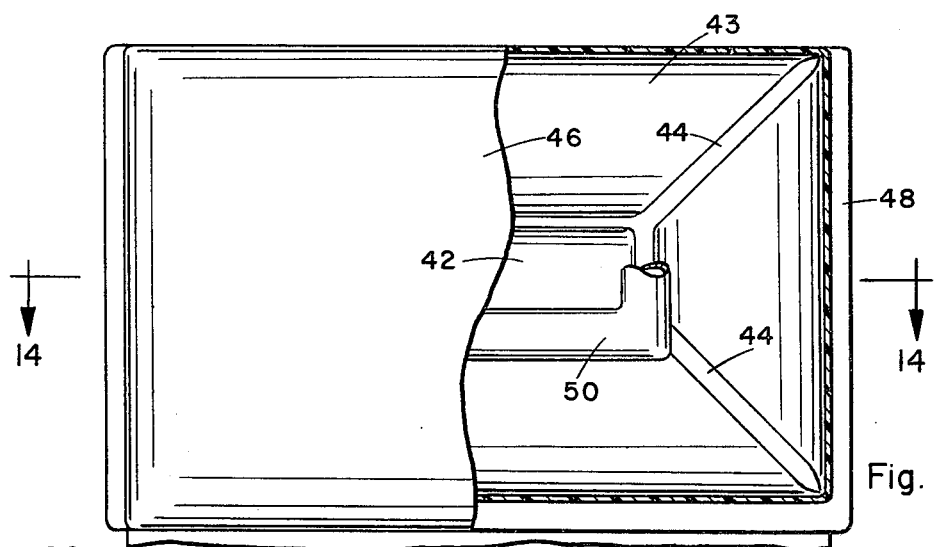
FIG. 13 is a front view of a further inflatable assembly, with portions cut away.
Figure 14:
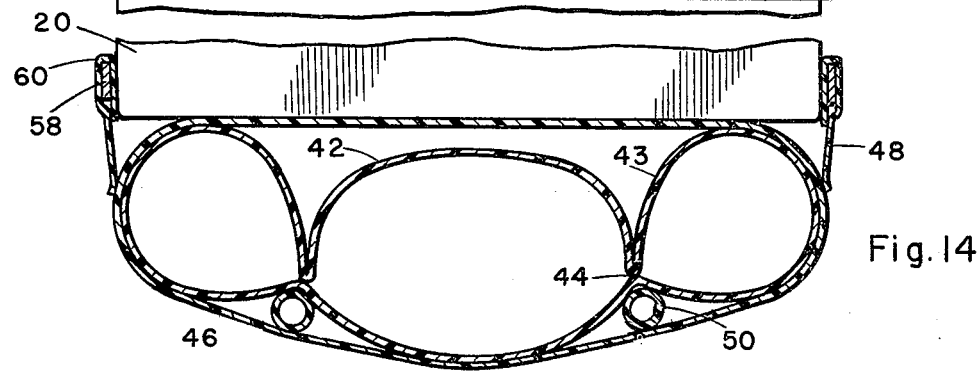
FIG. 14 is a sectional view taken on line 14—14 of FIG. 13.

Turning to the embodiments illustrated in FIGS. 13 and 14, the essential structure of the FIG. 3 modification is preserved except that a variant 42 of the inner pouch is utilized which is formed by heat sealing two sheets together to define both the pouch 42 and surrounding segments 43 joined along the seam lines 44. The structure may be warped or buckled forward somewhat as indicated in FIG. 14 and maintained in this mode by confining the entire inflated structure in an enclosing sheath 46 which is then faired to the sides of the trailer by a skirt 48. It has been found that both vertical and horizontal buckling of the sort illustrated in FIG. 14 can be achieved quite easily by proper seaming, and strength in this configuration is attained effectively by means of the enclosing sheath 46, or at least the rear half thereof which would of necessity be attached to the outer portions of the inflated body were the forward portion deleted.

A secondary rectangular tube structure 50, also illustrated in FIGS. 13 and 14, could be used to provide further support for the front surface of the sheath in an evenly contoured configuration. This tube could be inflated directly by one of the other inflated members so that only one pressure exists, the sheath itself being maintained at atmospheric pressure, or very slightly pressurized.

Figure 7:
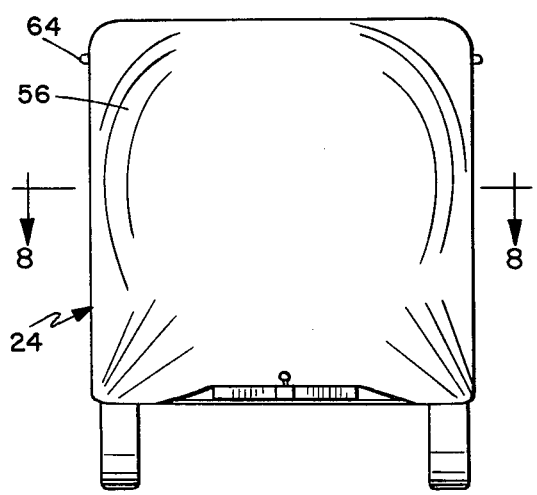
FIG. 7 is a front view of the structure of FIG. 6.
Figure 8:
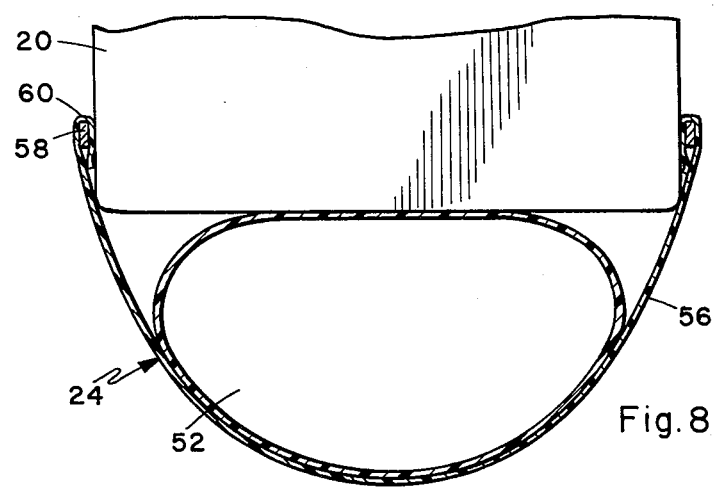
FIG. 8 is an enlarged sectional view taken on line 8—8 of FIG. 7.
Figure 9:
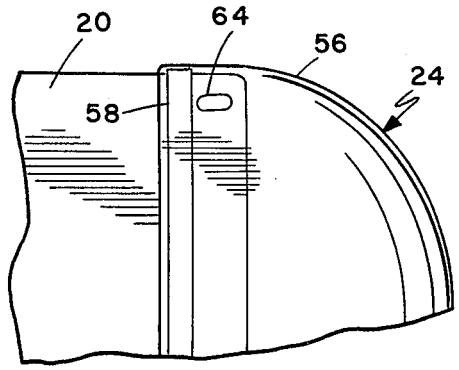
FIG. 9 is a side elevation view, similar to a portion of FIG. 6 but with a transparent fairing cover over the trailer clearance light.
Figure 10:
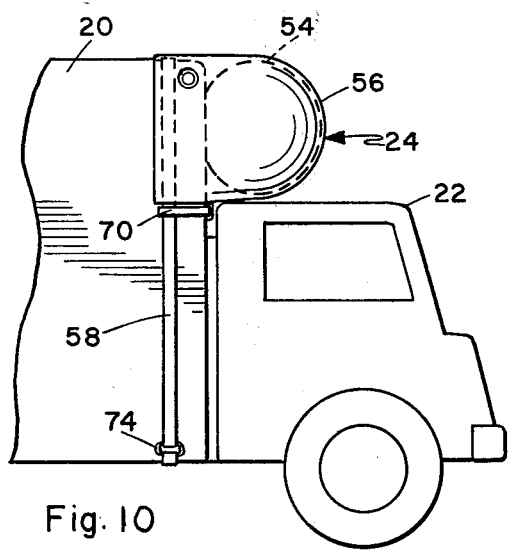
FIG. 10 illustrates a small type fairing on a truck.

Two final embodiments of the inflated portion of the structure are illustrated in FIGS. 6–8 and 9–10, both of these embodiments utilizing a single, monocellular inflated unit. In the first of these, this unit is a generally spherical pouch 52 and in the second a single cylindrical unit 54 is used, in both instances there being a skirt-forming sheath 56 fairing the pouch to the sides of the vehicle. The pouch of FIGS. 6–8 represents a simplified method of construction which suffers the disadvantage of protruding forward to an undesirable extent, but could be used where the clearance is sufficient, and the cylinder could be utilized where a long, low space requires streamlining as shown in FIG. 10.

Having described exemplary embodiments of the inflatable bodies, fairing means, and contour surfaces, several different means of attaching these structures to the front (or rear) end of a trailer or truck body will be indicated, although any suitable means should be considered within the scope of the invention. In the embodiments shown, a strap 58 is captured in a sleeve 60 formed in the skirt, and in the embodiment of FIGS. 1–4, this strap is cinched down around the sides of the front end of the trailer, and makes a 90° turn at a pair of angulated bars 62 extending from the truck sides to secure the streamlining device around its entire perimeter to the front of the trailer, as is best seen in FIG. 4. A pair of clearance lights 64 are also indicated in FIG. 4, these lights being evident on most trucks. So that the visibility of these lights is not hindered, cut-aways 66 are provided in the skirt surrounding the lights. The strap is positioned behind the clearance lights so that they serve as anchoring cogs for the strap. On those models of trailers in which the clearance lights are provided on the front, the skirt 34, at least those portions of it which cover the clearance lights, could be made transparent.

FIG. 5 illustrates a variant method of attaching the device to a somewhat varied truck style. In this embodiment, the strap 58 is continuous around the entire perimeter of the truck and is tightened with a winch 68, there being a second strap 70 connected to the first strap to secure the bottom portion 72 of the skirt to the front of the truck body. The FIG. 10 embodiment is similar in attaching means to FIG. 5, except that rather than utilizing a continuous strap around the truck body, flat clips 74 engaged on the truck bottom hold the strap in place.

In all the embodiments illustrated, the entire structure is constructed of lightweight, flexible, and thus portable material which is also inexpensive, and this material is formed into various shapes which are essentially form-retaining, or at least form-retaining with a minimum of external restraint so that stresses on the attachment means, primarily the fairing skirt, are minimized.

I claim:

1. A structure for streamlining vehicles comprising:
   a. an inflatable body comprising when inflated a substantially continuous tube defining the perimeter of said streamlining structure;
   b. a substantially continuous skirt attached to the perimeter of said inflatable body and attachable to the sides of a vehicle adjacent one end thereof to define a substantially continuous fairing between said one end of said vehicle and said inflatable body when the latter is inflated.

2. Structure according to claim 1 wherein said substantially continuous tube defines a central opening, and including a second inflatable body spanning said opening and disposed on the side of said tubular member remote from a vehicle to which said streamlining structure is attached such that a portion of said second inflatable body protrudes from said opening beyond the said first inflatable body to define a smoothly contoured wind-breaking surface.

3. Structure according to claim 2 wherein a portion of said second inflatable body and said skirt are defined by a continuous sheet member.

4. Structure according to claim 3 wherein said tube defines a substantially rectangular frame and said second inflatable body is generally rectangular and lenticular when inflated, whereby said inflatable bodies together are generally rectangular in planform and streamlined in cross section.

5. Structure according to claim 2 and including a continuous inflatable inner tube disposed forward of and tangentially contacting the firstmentioned tube and said second inflatable body.

6. Structure according to claim 5 and including a flexible sheet disposed on the non-streamlined side of said structure and connected to said firstmentioned inflatable tube along the substantial length thereof to restrain same from divergent movement.

7. Structure according to claim 2 and including a flexible sheet covering said continuous tube and second inflatable body on the windward side thereof.

8. Structure according to claim 1 wherein said structure includes a plurality of inflatable parallel ribs.

9. A structure for streamlining vehicles comprising:
a. a generally lenticular inflatable body;
b. a substantially continuous skirt attached to the perimeter of said inflatable body and attachable to the sides of a vehicle adjacent one end thereof to define a substantially continuous fairing between said one end of said vehicle and said inflatable body when the latter is inflated; and
c. means for supporting the perimeter of said inflatable body in spaced relation to one end of a vehicle to maintain said skirt in taut condition.

10. A structure for streamlining vehicles comprising:
a. a first flexible member comprising an inflatable body having a shape when inflated substantially determined by the pressure within said body;
b. a second flexible member comprising a sheet dimensioned to cover said inflatable body and retain same on one end of a moving vehicle;
c. means for attaching said sheet to the sides of a vehicle adjacent one end thereof whereby the protruding shape defined by said inflatable body is faired smoothly to an end of the moving vehicle to which it is attached.

* * * * *